(12) United States Patent
Georgi et al.

(10) Patent No.: US 12,032,361 B2
(45) Date of Patent: Jul. 9, 2024

(54) FULLY AUTOMATED ASSEMBLY AND CONTACTING OF ELECTRICAL COMPONENTS

(71) Applicant: SIEMENS AKTIENGESELLSCHAFT, Munich (DE)

(72) Inventors: Richard Georgi, Chemnitz (DE); Hans-Peter Kasparick, Chemnitz (DE); Nils Kroemer, Hohenstein-Ernstthal (DE); Mirko Löffler, Chemnitz (DE); Martin Thiele, Chemnitz (DE)

(73) Assignee: Siemens Aktiengesellschaft, Munich (DE)

( * ) Notice: Subject to any disclaimer, the term of this patent is extended or adjusted under 35 U.S.C. 154(b) by 470 days.

(21) Appl. No.: 17/289,564

(22) PCT Filed: Sep. 18, 2019

(86) PCT No.: PCT/EP2019/075029
§ 371 (c)(1),
(2) Date: Apr. 28, 2021

(87) PCT Pub. No.: WO2020/088834
PCT Pub. Date: May 7, 2020

(65) Prior Publication Data
US 2021/0397165 A1 Dec. 23, 2021

(30) Foreign Application Priority Data
Oct. 29, 2018 (EP) .................................... 18203115

(51) Int. Cl.
*G05B 19/418* (2006.01)
*B25J 9/16* (2006.01)

(52) U.S. Cl.
CPC ...... *G05B 19/41805* (2013.01); *B25J 9/1687* (2013.01); *G05B 2219/40583* (2013.01)

(58) Field of Classification Search
CPC .................... B25J 9/1687; G05B 19/41805
See application file for complete search history.

(56) References Cited

U.S. PATENT DOCUMENTS 4,810,154 A     3/1989  Klemmer et al.
2008/0317575 A1  12/2008  Yamazaki et al.
(Continued)

FOREIGN PATENT DOCUMENTS

CN     102189549 A    9/2011
CN     102821917 A   12/2012
(Continued)

OTHER PUBLICATIONS

PCT International Search Report and Written Opinion of International Searching Authority dated Sep. 9, 2020 corresponding to PCT International Application No. PCT/EP2019/075029 filed Sep. 18, 2019.

*Primary Examiner* — Mark A Connolly
(74) *Attorney, Agent, or Firm* — Henry M. Feiereisen LLC

(57) ABSTRACT

An automated assembly and contacting of electrical components are disclosed. Before a fed component is gripped, a control device of a mounting device for mounting and contacting electrical components is provided with information associated with the component comprising, in relation to a component coordinate system of the component, the position, orientation and a relevant length of electrical connections of the component, and the position and type of handling of the handling locations of the component. A position and an orientation of the component in relation to a machine coordinate system are known to the control device. Using the position and the orientation of the com- (Continued)

ponent in the machine coordinate system, the control device converts the positions and orientations defined by the information associated with the component into the machine coordinate system and takes the positions and orientations into account when gripping and assembling the component.

9 Claims, 3 Drawing Sheets

(56) References Cited

U.S. PATENT DOCUMENTS

| | | |
|---|---|---|
| 2011/0225787 A1 | 9/2011 | Sato et al. |
| 2012/0317535 A1 | 12/2012 | Schmirgel et al. |
| 2013/0054025 A1 | 2/2013 | Ito |
| 2014/0222205 A1 | 8/2014 | Velusamy et al. |
| 2015/0243153 A1 | 8/2015 | Molnar et al. |
| 2017/0129101 A1 | 5/2017 | Sonoda |
| 2018/0021950 A1* | 1/2018 | Shimodaira ............ B25J 13/02 318/568.11 |

FOREIGN PATENT DOCUMENTS

| | | |
|---|---|---|
| CN | 103076770 A | 5/2013 |
| CN | 103961098 A | 8/2014 |
| CN | 106308946 A | 1/2017 |
| CN | 107414817 A | 12/2017 |
| CN | 107598926 A | 1/2018 |
| CN | 108463743 A | 8/2018 |
| EP | 0823079 B1 | 10/2004 |
| EP | 2735410 A2 | 5/2014 |
| EP | 3260244 A1 | 12/2017 |
| EP | 3385038 A1 | 10/2018 |
| JP | H03217091 A | 9/1991 |
| JP | 2009000782 A | 1/2009 |

* cited by examiner

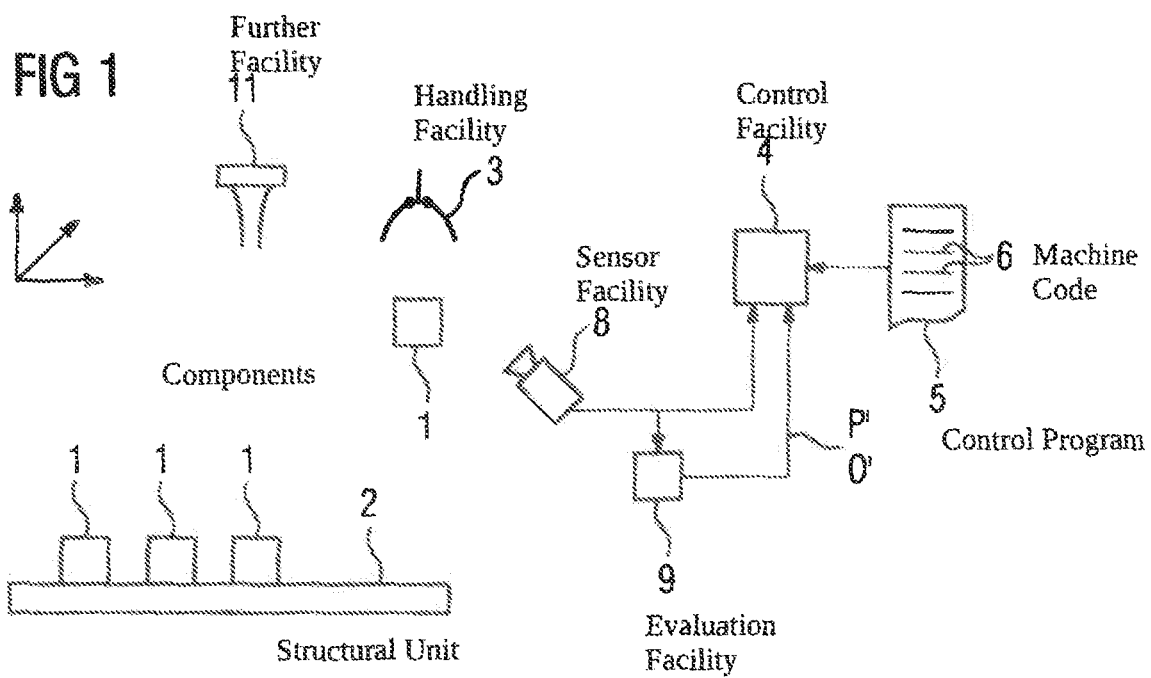

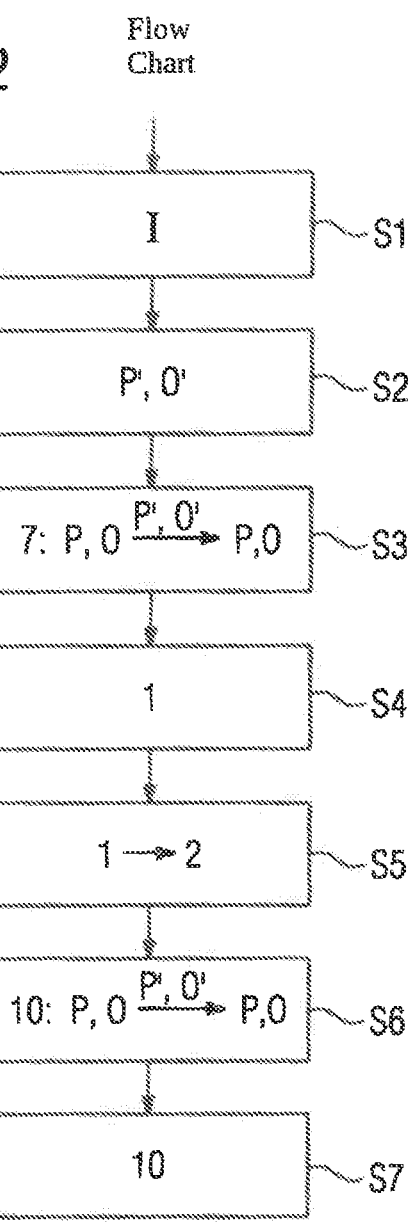

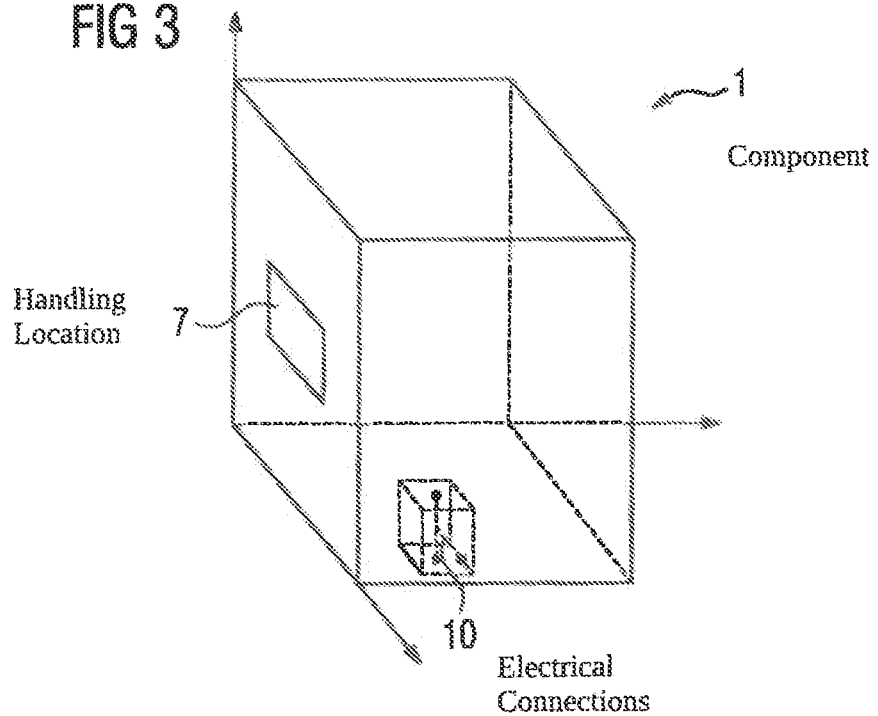
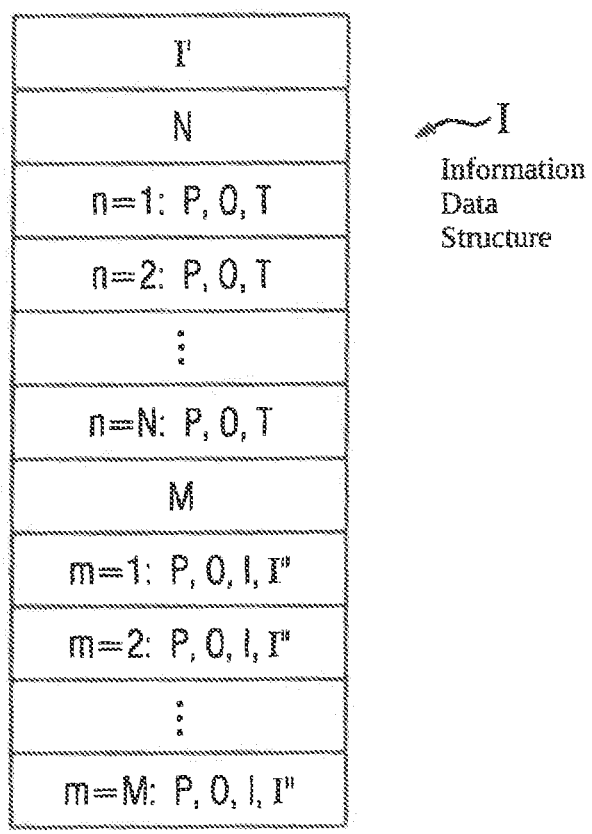

FULLY AUTOMATED ASSEMBLY AND CONTACTING OF ELECTRICAL COMPONENTS

CROSS-REFERENCES TO RELATED APPLICATIONS

This application is the U.S. National Stage of International Application No. PCT/EP2019/075029, filed Sep. 18, 2019, which designated the United States and has been published as International Publication No. WO 20201088834 A1 and which claims the priority of European Patent Application, Serial No. 18203115.3, filed Oct. 29, 2018, pursuant to 35 U.S.C. 119(a)-(d).

BACKGROUND OF THE INVENTION

The present invention relates to a method for the assembly and contacting of electrical components which have electrical connections and handling locations.

The present invention further relates to a control program for a control facility for controlling an assembly facility, wherein the control program comprises machine code which can be executed immediately by the control facility, wherein the execution of the machine code by the control facility causes the control facility to operate the assembly facility.

The present invention further relates to a control facility for controlling an assembly facility, the control facility being programmed with such a control program, such that the execution of the machine code by the control facility causes the control facility to operate the assembly facility.

The present invention further relates to an assembly facility for gripping, assembling, and contacting electrical components which have electrical connections and handling locations, the assembly facility comprising such a control facility.

The present invention further relates to the use of a data structure of a component by a control facility of an assembly facility when actuating the assembly facility in the context of gripping and assembling the component and in the context of electrically connecting the electrical connections of the component.

A large amount of data is required for the automated assembly of electrical components. As a rule, this data is not available or only partially available in the prior art. There are no specific technical features which could serve as the basis for automated assembly. The scant information available is often unstructured and must be entered manually in databases.

A method for assembling and contacting electrical components is known from EP 3 260 244 A1, wherein the components have electrical connections and handling locations, A position and an orientation of the respective component are known to a control facility of the assembly facility, in relation to a machine coordinate system of the assembly facility. The control facility then actuates the assembly facility such that the component is properly assembled and properly electrically connected.

The object of the present invention is to provide possibilities by means of which automated assembly and contacting of electrical components is enabled in a simple manner.

SUMMARY OF THE INVENTION

The object is achieved by a method for assembling and contacting electrical components as set forth hereinafter.

Advantageous embodiments of the method according to the invention are the subject matter of dependent claims.

According to the invention, a method for assembling and contacting electrical components which have electrical connections and handling locations is provided, in which a control facility of the assembly facility is provided with information associated with the respective component before a component supplied to the assembly facility is gripped, in relation to a component coordinate system of the respective component, the information associated with the respective component, for the electrical connections of the respective component, in each case comprises their position, their orientation, and a relevant length, and, for the handling locations, at least their respective position and the type of handling and preferably also their respective orientation, a position and an orientation of the respective component in relation to a machine coordinate system of the assembly facility are known to the control facility, based on the position and the orientation of the respective component in the machine coordinate system, the control facility converts the positions and orientations defined by the information associated with the respective component into the machine coordinate system, the control facility takes into account the type and the positions converted into the machine coordinate system and, if available, also the orientations of the handling locations of the respective component converted into the machine coordinate system when actuating the assembly facility in the context of gripping and assembling the respective component, and the control facility takes into account the positions and orientations converted into the machine coordinate system and the relevant lengths of the electrical connections of the respective component when actuating the assembly facility in the context of electrically connecting the electrical connections of the respective component.

Due to the fact that the information associated with the respective component for the handling locations comprises at least their respective position and the type of handling, and preferably also their respective orientation, it is possible for the assembly facility, in a simple and automated manner, to grip the respective component by means of a suitable gripper or the like and convey it to the desired point of a structural unit to be assembled. In particular, the type of handling can specify the type of handling tool with which the respective component can be gripped. For example, it is possible to specify whether gripping is to take place in the manner of pincer-like gripping or by means of a vacuum suction device. The position indicates the point at which the respective handling location is located. Analogous embodiments apply, if necessary, to the orientation.

By virtue of the fact that the information associated with the respective component for the electrical connections of the respective component in each case comprises their position, their orientation, and a relevant length, it is easily possible to inform the control facility as to at which point (position), in which direction (orientation) and how far (relevant length) a mating connection or, if necessary, also the component must be moved while the mating connection is held stationary. The mating connection can be, for example, a single conductor. However, other embodiments are also conceivable and possible.

The information associated with the respective component represents, as it were, the electronic description of the respective component which is required in order to be able to assemble and contact the respective component in an automated manner.

The components themselves can be elementary components such as, for example, individual terminals. They can also be more complex components such as groups of terminals, circuit breakers, power supply devices, peripheral assemblies, etc.

By virtue of the fact that, in relation to a machine coordinate system of the assembly facility, the position and the orientation of the respective component are known to the control facility, a transformation (conversion) of the positions and orientations of the component, which are initially only defined in the component coordinate system, into the machine coordinate system is easily possible.

The information associated with the respective component preferably has a uniform data structure across all components. This results not only in simplified handling of the information associated with the component by the control facility, but furthermore also standardized, uniform and thus relatively reliable creation of the information. The uniform data structure can in particular be designed as a data container The information associated with the respective component preferably also comprises information about the function of the respective component as a whole. This information can be particularly advantageous in the context of an intellectual review by a user.

The information associated with the respective component preferably also comprises information about the type and/or function of the electrical connections of the respective component. This information makes automated assembly and contacting even easier. For example, with regard to the type of respective electrical connection, the information can additionally be available as to whether a respective electrical connection is a screw terminal, an insulation displacement terminal, a cage tension spring, a contact shoe, or a contact pin. With regard to the function of the respective electrical connection, for example, the information can additionally be available as to whether it is a connection for a supply potential, a clock connection, a data connection, etc.

The position and orientation of the respective component in relation to the machine coordinate system can be made known to the control facility in various ways. For example, it is possible for the respective component to be supplied to the assembly facility at a defined location and in a defined orientation and for this location and this orientation to be known to the control facility. Alternatively, it is possible for the position and the orientation of the respective component to be transmitted individually to the control facility for the respective component. Alternatively, it is also possible for the control facility to detect sensor data when the respective component is supplied and to determine the position and the orientation of the respective component on the basis of the sensor data.

The object is also achieved by a control program as set forth hereinafter. According to the invention, the execution of the machine code by the control facility causes the control facility to operate the assembly facility according to a method according to the invention.

The object is also achieved by a control facility as set forth hereinafter. According to the invention, the control facility is programmed with a control program according to the invention, such that the execution of the machine code by the control facility causes the control facility to operate the assembly facility according to a method according to the invention.

The object is also achieved by an assembly facility claim 11. According to the invention, the assembly facility comprises a control facility as set forth hereinafter. According to the invention, the assembly facility comprises a control facility according to the invention.

The object is also achieved by the use of a data structure of a component by a control facility of an assembly facility as set forth hereinafter. Advantageous embodiments of the use are the subject matter of dependent claims.

According to the invention, the data structure comprises information associated with the component. In relation to a component coordinate system of the component, for electrical connections of the component, the information comprises their position, their orientation, and a relevant length, and, for handling locations of the component, at least their respective position and the type of handling, and preferably also their respective orientation.

The data structure preferably also additionally comprises information about the function of the component as a whole. Alternatively, or in addition, the data structure additionally comprises information about the type and/or function of the electrical connections of the component.

BRIEF DESCRIPTION OF THE DRAWING

The properties, features and advantages of this invention described above, and the manner in which these are achieved, will become clearer and more comprehensible in connection with the following description of the exemplary embodiments which are explained in more detail in connection with the drawings. Here, in a schematic view:

FIG. 1 shows an assembly facility,
FIG. 2 shows a flow chart,
FIG. 3 shows a component, and
FIG. 4 shows a data structure,

DETAILED DESCRIPTION OF PREFERRED EMBODIMENTS

According to FIG. 1, components 1 are to be assembled on a larger, more complex structural unit 2 in an automated manner by means of an assembly facility. To this end, the assembly facility has a handling facility 3 by means of which the components 1 are individually brought to their respective destination on the larger structural unit 2.

The assembly facility also comprises a control facility 4. The control facility 4 controls the assembly facility. The control facility 4 is programmed with a control program 5. The control program 5 comprises machine code 6 which can be executed by the control facility 4. The execution of the machine code 6 by the control facility 4 causes the control facility 4 to operate the assembly facility according to a method which is explained in more detail hereinafter.

In the context of automated assembly, the components 1 are fed one after the other to the assembly facility. FIG. 1 shows—purely by way of example—a situation in which three components 1 are already assembled and a further component 1 is about to be assembled. The components 1 can be fed in under the control of the control facility 4. However, it is also possible for the components 1 to be fed to the assembly facility in some other way.

In order to be able to properly assemble the further component 1, information I about the corresponding component 1 is first made available to the control facility 4 in a step S1, as shown in FIG. 2. The information I is explained in detail hereinafter in connection with FIGS. 3 and 4.

According to FIG. 3, the component 1 has a number of handling locations 7. The minimum number of handling locations 7 is 1. Corresponding to this, only a single handling location 7 is shown in FIG. 3. In many cases, however, a plurality of handling locations 7 are present.

According to FIG. 4, the information I comprises the number N of handling locations 7. Furthermore, the information I for each handling location 7 comprises at least its respective position P and preferably also its orientation O. The position P and the orientation O are in relation to a component coordinate system of the component. FIG. 3 shows, purely by way of example, the origin and three directions arranged orthogonally to each other of a corresponding rectangular Cartesian coordinate system. Furthermore, the information I for each handling location 7 comprises its type T. The type T indicates the type of handling facility 3 with which the respective component 1 can be gripped at this handling location 7. Furthermore, the information I for the respective handling location 7 may also comprise its size, for example a diameter.

The information I also comprises further details which are not related to the handling locations 7. This information I will be explained later.

In a step S2, a position P' and an orientation O" of the supplied component 1 are known to the control facility 4. The position P' and the orientation O' are in relation to a machine coordinate system, i.e., to the coordinate system in which the components of the assembly facility move. FIG 1 shows, purely by way of example, the origin and three directions arranged orthogonally to each other of a corresponding right-angled Cartesian coordinate system.

The position P' and the orientation O' of the supplied component 1 can be known to the control facility 4 in various ways. For example, it is possible for the component 1 to be supplied to the assembly facility at a defined location and in a defined orientation. in this case, it is only necessary to specify this location and this orientation once to the control facility 4, for example, in the context of parameterization. Alternatively, it is possible for the position P' and the orientation O' of the component 1 to be transmitted individually to the control facility 4. For example, a sensor facility 8 (for example, a camera system or a laser scanner) can be present, by means of which sensor data is detected when the component is supplied. It is possible to supply the sensor data directly to the control facility 4. In this case, the control facility 4 detects the corresponding sensor data via the sensor facility 8 and as a result, can determine the position P' and the orientation O' of the supplied component 1 based on the sensor data. Alternatively, the sensor facility 8 can be assigned an evaluation facility 9. In this case, the evaluation facility 9 can determine the position P' and the orientation O' of the supplied component 1 on the basis of the sensor data detected by the sensor facility 8 and transmit the position P' and the orientation O' of the supplied component 1 to the control facility 4 individually for the supplied component 1.

In a step S3, the control facility 4 transforms the positions P and orientations O for the individual handling locations 7 from the component coordinate system into the machine coordinate system. A corresponding conversion therefore takes place. This is possible because a direct conversion of coordinates in the component coordinate system into the machine coordinate system is possible with the position F and the orientation O' of the supplied component 1 in the machine coordinate system. The corresponding conversion is generally known to those skilled in the art.

In a step S4, the control facility 4 then actuates the handling facility 3 so that the handling facility 3 grips the supplied component 1 at the correct handling locations 7. Then, in a step S5, the control facility 4 positions the component 1 at the desired location of the structural unit 2 by means of appropriate actuation of position-controlled axes of the assembly facility (the axes are not shown) and thereby assembles it. The control facility 4 takes into account the type of handling locations 7 in that it selects the "correct" handling facility 3 and/or in that it grips the supplied component 1 by means of the handling facility 3 at handling locations 7 suitable for the handling facility 3. Of course, the control facility 4 also takes into account the positions transformed into the machine coordinate system, both when gripping and when assembling the component 1, as otherwise it would be unable to guide the handling facility 3 to the correct positions. The same applies, if present, to the orientations of the handling locations 7 transformed into the machine coordinate system.

In accordance with the schematic view in FIG. 3, the components 1 also have electrical connections 10. The minimum number of electrical connections 10 is 1. Correspondingly, only a single electrical connection 10 is shown in FIG. 3. In many cases, however, a plurality of electrical connections 10 is present.

According to FIG. 4, the information I also comprises the number M of electrical connections 10, Furthermore, the information I for each electrical connection 10 comprises at least their respective position P, their orientation O, and a relevant length l. The position P and the orientation O are in relation to the component coordinate system of the component 1. This information is also known to the control facility 4 in step S1. In a step S6—analogous to step S3—for the individual connections 10, the control facility 4 can therefore also transform their positions P and orientations O from the component coordinate system into the machine coordinate system. A transformation of the relevant length l as well is not necessary. This is because the relevant length l as such remains unchanged.

In a step S7, the control facility 4 then actuates the handling facility 3 or a further facility 11 so that the electrical connections 10 are contacted individually or in groups—possibly also all the electrical connections 10 together. For example, in order to make contact with an individual electrical connection 10, the control facility 4 can introduce a suitable wire into this electrical connection 10. The location at which this wire must be inserted into this electrical connection 10 is known to the control facility 4 due to the position P of the corresponding electrical connection 10. The direction in which the wire must be inserted into this electrical connection 10 is known to the control facility 4 due to the orientation O of the corresponding electrical connection 10. The relevant length l can, for example, indicate how far the wire has to be introduced into this electrical connection 10.

The control facility 4 thus takes into account the positions and orientations transformed into the machine coordinate system and the relevant lengths l of the electrical connections 10 of the component 1 when controlling the assembly facility in the context of electrically connecting the electrical connections 10 of the component 1.

As a rule, the information I associated with the respective component 1 is embedded in the data structure shown in FIG. 4 independently of the respective component 1. The information I may, of course, differ from component 1 to component 1. However, the data structure as such is preferably uniform across all components. In particular, the data structure can be designed as a data container.

It is possible for the previously explained information I to be associated exclusively with the respective component 1. Preferably, however, further information I', I" is also associated with the respective component 1. This further information I', I" is also embedded in the data structure of FIG. 4.

For example, the further information I" can comprise the function of the respective component 1 as a whole, i.e. whether it is, for example, a terminal, a peripheral assembly, a power supply, a circuit breaker, etc. The information I" is related to the respective electrical connection 10 of the respective component 1. It can describe, for example, the type and/or function of the respective electrical connection 10. For the type of respective electrical connection 10, the further information I" can describe, for example, whether the respective electrical connection 10 is a screw terminal, a cage tension spring, an insulation displacement terminal, a pin projecting beyond the rest of the component 1, etc. It can also describe which cross section or which cross-sectional area the respective electrical mating connection (for example, a wire) should have, whether the wire should be stripped, etc. For the function of the respective electrical connection 10, the further information I" can describe, for example, whether the respective electrical connection 10 is a signal connection, a supply connection, a clock connection, etc.

In summary, the present invention therefore relates to the following facts:

Information I associated with the respective component 1 is made available to a control facility of an assembly facility for assembling and contacting of electrical components 1 before a component 1 supplied to the assembly facility is gripped. In relation to a component coordinate system of the respective component 1, for electrical connections 10 of the respective component 1, in each case the information I comprises their position P, their orientation O, and a relevant length and, for handling locations 7 of the respective component 1, at least their respective position P and the type of handling and preferably also their respective orientation O. A position P' and an orientation O' of the respective component 1 are known to the control facility 4 in relation to a machine coordinate system. On the basis of the position P' and the orientation O' of the respective component 1 in the machine coordinate system, it converts the positions P and orientations O defined by the information I associated with the respective component 1 into the machine coordinate system. When gripping and assembling the respective component 1, it takes into account the type and the positions P converted into the machine coordinate system and, if available, also the orientations O of the handling locations 7 converted into the machine coordinate system. When electrically connecting electrical connections 10, the control facility 4 takes into account the positions P and orientations O converted into the machine coordinate system and the relevant lengths l of the electrical connections 10.

The present invention has many advantages, in particular, starting with the creation of the information I and its association with the respective component 1, continuous automated use of the information I is made possible. The information I is made available in a standardized, digitally processed form.

Although the invention has been illustrated and described in more detail by the preferred exemplary embodiment, the invention is not limited by the disclosed examples, and other variations may be derived therefrom by a person skilled in the art without departing from the protective scope of the invention.

The invention claimed is:

1. A method for assembling and contacting electrical components which have electrical connections and handling locations by an assembly facility, said method comprising:
   providing a control facility of the assembly facility with stored information associated with a component before the component supplied to the assembly facility is gripped, said information having a uniform data structure across all components,
   wherein, in relation to a component coordinate system of the component, the information associated with the component comprises position, orientation and a relevant length for the electrical connections of the component and at least one of a position, a type of handling and an orientation for the handling locations, wherein, in relation to a machine coordinate system of the assembly facility, a position and an orientation of the component are known to the control facility;
   converting with the control facility the positions and orientations defined by the information associated with the component into the machine coordinate system based on the position and the orientation of the component in the machine coordinate system;
   actuating the assembly facility in a context of gripping and assembling the component, wherein the control facility takes into account the type and the positions converted into the machine coordinate system and, if present, also the orientations of the handling locations of the component converted into the machine coordinate system; and
   actuating the assembly facility in a context of electrically connecting the electrical connections of the component, wherein the control facility takes into account the positions and orientations converted into the machine coordinate system and the relevant lengths of the electrical connections of the component.

2. The method of claim 1, wherein the uniform data structure is designed as a data container.

3. The method of claim 1, wherein the information associated with the component additionally comprises information about the type of the electrical connections of the respective component.

4. The method of claim 1, wherein the position and the orientation of the component in relation to the machine coordinate system are known to the control facility in that the component is supplied to the assembly facility at a defined location and in a defined orientation and that this location and this orientation are known to the control facility.

5. The method of claim 1, wherein the position and the orientation of the component are known to the control facility in relation to the machine coordinate system in that the position and the orientation of the component are transmitted to the control facility individually for the component.

6. The method of claim 1, wherein the position and the orientation of the component are known to the control facility in relation to the machine coordinate system in that the control facility detects sensor data when supplying the component and determines the position and the orientation of the respective component based on the sensor data.

7. A non-transitory computer-readable medium comprising a control program for a control facility for controlling an assembly facility for gripping and assembling electrical components, said control program comprising machine code which when loaded into a memory of the control facility and executed by a processor of the control facility causes the control facility to operate the assembly facility to perform a method as set forth in claim 1.

8. A control facility for controlling an assembly facility for gripping and assembling electrical components, said control facility programmed with a control program stored on a non-transitory computer-readable medium and comprising machine code which when loaded into a memory of the control facility and executed by a processor of the control facility causes the control facility to operate the assembly facility to perform a method as set forth in claim 1.

9. An assembly facility for gripping, assembling, and contacting electrical components which have electrical connections and handling locations, said assembly facility comprising a control facility programmed with a control program stored on a non-transitory computer-readable medium and comprising machine code which when loaded into a memory of the control facility and executed by a processor of the control facility causes the control facility to operate the assembly facility to perform a method as set forth in claim 1.

* * * * *

UNITED STATES PATENT AND TRADEMARK OFFICE
CERTIFICATE OF CORRECTION

| | | |
|---|---|---|
| PATENT NO. | : 12,032,361 B2 | Page 1 of 1 |
| APPLICATION NO. | : 17/289564 | |
| DATED | : July 9, 2024 | |
| INVENTOR(S) | : Richard Georgi et al. | |

It is certified that error appears in the above-identified patent and that said Letters Patent is hereby corrected as shown below:

On the Title Page

On the second page, under FOREIGN PATENT DOCUMENTS:
Replace "CN 108463743 A" with -- CN 108453743 A --.

Signed and Sealed this
Thirteenth Day of August, 2024

Katherine Kelly Vidal
*Director of the United States Patent and Trademark Office*